United States Patent
Lindskog et al.

(10) Patent No.: US 7,855,999 B2
(45) Date of Patent: Dec. 21, 2010

(54) WIRELESS STATION AND A TRANSMISSION METHOD IN A WIRELESS LOCAL AREA NETWORK

(75) Inventors: Jan Lindskog, Pixbo (SE); Stefan Rommer, Gothenburg (SE); Gunnar Rydnell, Ravianda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1365 days.

(21) Appl. No.: 10/862,023

(22) Filed: Jun. 7, 2004

(65) Prior Publication Data

US 2005/0018638 A1    Jan. 27, 2005

Related U.S. Application Data

(63) Continuation of application No. PCT/SE02/02179, filed on Nov. 27, 2002.

(30) Foreign Application Priority Data

Dec. 7, 2001    (SE)    .................................... 0104113

(51) Int. Cl.
    *H04W 4/00*    (2009.01)
(52) U.S. Cl. .................... 370/338; 370/465; 370/476
(58) Field of Classification Search ................ 370/277, 370/281, 311, 318, 338, 339, 346, 349, 363, 370/430, 470, 471, 472, 474, 475, 476, 506, 370/508, 913, 95.3, 347, 319; 455/151.2, 455/422.1, 426.2, 554.2, 562.1, 572, 573, 455/574; 307/64
See application file for complete search history.

(56) References Cited

U.S. PATENT DOCUMENTS

| 5,548,282 A | 8/1996 | Escritt et al. |
| 5,559,804 A * | 9/1996 | Amada et al. ............... 370/347 |
| 5,619,491 A * | 4/1997 | Panzer ........................ 370/342 |
| 5,889,772 A * | 3/1999 | Fischer et al. ............... 370/346 |
| 6,285,665 B1 * | 9/2001 | Chuah ........................ 370/319 |
| 6,469,991 B1 * | 10/2002 | Chuah ........................ 370/329 |
| 6,567,416 B1 * | 5/2003 | Chuah ........................ 370/418 |
| 2002/0142812 A1 * | 10/2002 | Goodman ................... 455/572 |
| 2003/0067883 A1 * | 4/2003 | Azenkot et al. ............. 370/252 |

(Continued)

OTHER PUBLICATIONS

Lonworks PLT-22 Power Line Transceiver User's Guide, (c) 1996-1999, Echelon. Retrieved on Jan. 31, 2003 from the Internet: <gttoL// ns.vnb.viste.com/LonWorksDoc/Echelon-Doc-2001/Manuarls/078-0175-01B.pdf>, See pp. 5-3, line 12-p. 5-5, line 6.

(Continued)

*Primary Examiner*—Kevin C Harper
*Assistant Examiner*—Leon Andrews
(74) *Attorney, Agent, or Firm*—Nixon & Vanderhye P.C.

(57) ABSTRACT

A wireless station, in a wireless LAN, includes a network interface to a network interface device, e.g., a NIC, that includes a transceiver, an antenna, at least a first power supply or energy holder. The wireless station supports transmission of data in frames of variable length. Frame fragmentation is implemented by dividing a (long) frame into a number of frame fragments. Each fragment is sent as a non-fragmented frame. The length of a time period before or between transmission of (consecutive) frame fragments is controlled in order to decrease energy consumption during a predetermined time interval.

21 Claims, 6 Drawing Sheets

U.S. PATENT DOCUMENTS

2008/0037541 A1* 2/2008 Souissi et al. ............... 370/392

OTHER PUBLICATIONS

Chien et al: "Adaptive Radio for Multimedia Wireless Links"; In: IEEE Journal on Selected Areas in Communications, vol. 17, No. 5, May 1999, See p. 793, col. 2, line 1-col. 2, line 26, p. 797, col. 2, line 29-p. 798, col. 1, line 46; abstract.

BreezeNet PRO. 11 Series, Preference Guide, Breeze Com Ltd, Jul. 1998, Retrieved on Jan. 31, 2003 from the Internet: www.dateline.ru/download/manual/man-breezenet-pro-ref.pdf, See pp. 8-5, 8-6 8-15 and 8-16.

Swedish Application No. 0103394-3, filed Oct. 12, 2001, Lindskog.

* cited by examiner

STATE OF THE ART

STATE OF THE ART

WIRELESS STATION AND A TRANSMISSION METHOD IN A WIRELESS LOCAL AREA NETWORK

This application is a continuation of PCT International Application No. PCT/SE02/02179, filed on 27 Nov. 2002, which designated the US. PCT/SE02/02179 claims priority to SE Application No. 0104113-6 filed 7 Dec. 2001. The entire contents of these applications are incorporated herein by reference.

FIELD OF THE INVENTION

The present invention relates to wireless Local Area Networks, LANs, in this application also intended to cover Metropolitan Area Networks, MAN, in which a wireless station which comprises a network interface to network interface means comprising receiving/transmitting means, antenna means, at least first power supply means or energy holding means, and which station supports transmission of data in frames of variable length. The invention also relates to a transmission method in a wireless local area network from a wireless station, or from an access point.

BACKGROUND

Wireless stations in wireless local area systems are powered from a battery. Different kinds of wireless stations are known, and they may be mobile. Examples of wireless stations are Laptops, Palmtops, various kind of handhelds, but also other wireless stations are known, and still other types are expected to be introduced in the future. A general requirement is that the batteries used for power supply should be small. On the other hand, a high output power on the air interface is required in order to ensure a good contact with access points, base stations etc, or with other wireless stations, e.g. for systems operating without a real access point, where instead each wireless station may act as a temporary access point. See commonly assigned Swedish application No. 0103394-3, entitled "Wireless Networks and a Method of Reducing Signalling in a Network", Lindskog, filed on Oct., 12, 2001 (now abandoned), and the content of which herewith is incorporated herein by reference. This may be in conflict with the requirement that the batteries should be as small as possible. Existing WLAN systems on 2.4 GHz frequency band, e.g. IEEE 802.11b, have a fairly low power consumption and subsequently acceptable requirements upon existing interface standards, e.g. USB, PC-Card etc. In order to save battery power, the active periods for the wireless station have been reduced as much as possible, e.g. through the introduction of so called sleep modes which may be implemented in different manners, i.e. entry of a sleep mode after detecting inactivity for a given time period, a wireless station enters a sleep mode only transmitting page signals, by paging until a response is received, etc. Thermal problems can be solved by making pauses, cooling down, etc.

With recently developed systems or with developing systems the problems associated with available power contra required output power have become even more apparent in that increased data throughput for WLAN products, e.g. IEEE 802.11a, requires a higher power consumption. In such systems a wireless station often comprises network interface means in the form of cards, e.g. so called Network Interface Cards (NIC), which are provided with energy holding means or auxiliary power supply means such as charge reservoirs, e.g. capacitor banks, built at the transmitter of the NIC.

In addition thereto standards often require that long frames can be sent, for example at least 1500 byte frames. Transmission of such a long frame requires a lot of energy. All this energy may not be taken directly from the energy holding means, e.g. the battery, of the wireless station. Therefore the above mentioned charge reservoirs or capacitor banks may be used. It is however both expensive and space demanding to build large charge reservoirs at the NIC transmitter. Also the network interface between wireless station and NIC is a limiting factor on long transmit times for long frames and constitutes a problem for small devices or wireless stations with a limited battery power, since the energy consumption during the time it takes to transmit may be higher than what can be charged from the interface towards a mobile host. It is a problem that sufficient energy/power can not be provided even if a so called charge reservoir is used in addition to the battery. IEEE 802.11 is one example a WLAN standard requiring that at least 1500 byte frames can be sent (particularly 2346 byte frames).

IEEE has recently added a 5 GHz high-rate physical layer (IEEE 802.11a) to the wireless LAN (WLAN) standard 802.11. This new physical layer uses Orthogonal Frequency Division Multiplexing (OFDM) as a modulation technique. Previously used physical layers (IEEE 802.11 and 802.11b) operate at a lower rate, in the frequency band of 2.4 GHz and use Frequency Hopping (FH) or Direct Sequence Spread Spectrum (DSSS) modulation.

OFDM is a modulation technique which requires highly linear amplifiers which means that it is a very power inefficient technique. For comparison, FH and DSSS are much more power efficient. The power output from the antenna of a WLAN NIC has to be high enough to support a reasonable coverage area. The power consumption of a WLAN card, on the other hand, has to be low enough in order do not too quickly drain the battery of the wireless station. The maximum peak current from a wireless station is also limited, particularly for handheld devices. The maximum peak current may also be limited due to the interface, e.g. Card Bus or USB, towards the WLAN NIC or due to current limitations from the mobile host, e.g. PC.

Using the 6 Mbps Physical mode (PHY), which is the slowest PHY mode of IEEE 802.11a, the longest possible MAC frame will take 3.1 ms to transmit, including preamble. This is a very long transmit time compared to the maximum continuous transmit time of for example HIPERLAN type 2, which is a comparable WLAN standard using OFDM in the 5 GHz frequency band.

IEEE 802.11 uses so called MPDU, (Medium access control Protocol Data Unit) frames to transmit data over the wireless medium, (WM). The maximum size of a frame, MSDU, header and FCS (Frame Check Sequence) is 2346 octets, and, as referred to above, the long transmit times of frames will constitute a serious problem for small wireless stations. Implementation of various kinds of sleep functionalities will not solve the problem, since the long frames still have to be sent according to the standard. If instead the transmission range is reduced, this will result in other problems, e.g. in that more access points will be needed.

Thus, there is no satisfactory solution known to the problem of keeping down the power requirements while still being able to meet the requirements as to transmission of long frames and coverage range, or the problem of the output power requirements contra available power supply in a wireless station.

SUMMARY

It is therefore an object to provide a wireless station as initially referred to, through which the transmit power requirements can be reduced. A wireless station is also needed through which the available power in relation to the required output power or the requirements thereon can be satisfied in an easy and cost effective manner, and without requiring expensive and large space demanding energy holding means. Particularly a wireless station is needed, which can be kept small and still satisfy the requirements as to output power for communication systems, particularly wireless LANs. Still further a wireless station is needed through which the transmission range (coverage area) can be kept high even if the energy required to transmit single MPDU is lowered. Particularly, a wireless station is needed through which long data frames can be sent such that given system requirements specifying how long data frames should be sent can be upheld. In a particular implementation, a wireless station is needed through which, for example, the requirements in ethernet or IEEE 802.11 WLAN as to the capability of transmission of at least 1500 byte frames can be upheld.

Still further a wireless station is needed through which the available power can be used in such a manner that the requirements as to output power, even if comparatively power inefficient modulation techniques, such as OFDM, are used, while still efficiently using the medium, can be upheld.

A wireless station is also needed which is able to solve the problem of the power consumption during the transmit time of long frames being higher than what can be charged from the interface, i.e. the network interface, e.g. CardBus, towards the mobile host. A wireless station is also needed through which power output requirements can be met also while considering restrictions as to maximum peak current from a mobile terminal, for example in handheld devices e.g. due to the network interface to a network interface means, a network interface card, multipurpose card or multimedia card or expansion card.

A wireless LAN through which one or more of the objects referred to above can be met is also needed. Still further a method for transmitting data frames of variable length over a wireless medium in a wireless LAN is needed, through which one or more of the objects referred to above can be met.

Therefore a wireless station as initially referred to is provided which implements fragmentation of frames by dividing (long) frames into a number of frame fragments. Each fragment of a frame is sent as a non-fragmented frame and means are provided for controlling the length of the time periods before/between transmission of (consecutive) frame fragments in order to decrease the energy consumption during a predetermined time interval. Particularly also second/auxiliary power supply means or energy holding means are provided. The lengths of the time periods may then be controlled in order to allow for reloading of the first and/or second power supply means or energy holding means as provided by the network interface means (e.g. NIC), particularly such that the power available from the first and/or second power supply means or energy holding means can be controlled. In a most advantageous implementation each fragment contains indication means to indicate if a further frame fragment will follow. If there is no further fragment to follow, there will be no indication, or the indication means are inactivated or set to zero.

Particularly the energy consumption is smoothed out/averaged, or the duration of power peaks for emission is decreased.

Frame fragmentation is known e.g. from IEEE 802.11. However, in this standard the reason for dividing frames into frame fragments (for long frames) is to increase the probability of successful transmission on channels where reception reliability of long frames is low. Thus, the intention is to provide an efficient utilization of the bandwidth in the medium, air. But this has nothing to do with reducing power requirements or economizing power. The latter problem can also not be solved by implementing frame fragmentation as suggested in the IEEE 802.11, not even un-intentionally, since according to IEEE 802.11, unicast MSDUs (MAC Service Data Units) can be divided into smaller fragments, so called MPDUs (Mac Protocol Data Units), and all fragments of an MSDU should be sent in a single burst. Each fragment in the burst is followed by a Short Inter Frame Space (SIFS) interval, an Acknowledgement Frame (ACK) sent by the receiver, and another SIFS. Each fragment except for the last fragment of the burst shall have a so called more fragment (MF) bit in the frame header set to one to indicate that a further fragment will follow. The more fragment bit is utilized by the receiving side to determine whether or not all fragments in an MSDU (Medium access control Service Data Unit) have been received. The last fragment, as well as non-fragmented MSDUs, shall have the more fragment bit set to zero. However, since all fragments here are to be sent in a burst, the time period between consecutive fragments is much too short to allow for any reloading of the second energy holding means. Thus it will be difficult to meet the requirements relating to sending long frames utilizing the available power from the battery and a reloadable second energy holding means, for example in a network interface means. It will be apparent that there is simply no time to reload said second energy holding means, for such a known system. According to the technology described here it is optional to implement indication of further fragments.

It will be appreciated by those skilled in the art that in order to reduce the length of incoming MSDU frames into a NIC, the NIC may also consume the MSDU and divide the MSDU into two or more MSDUs, where each MSDU will be treated as a normal MSDU transmission.

In one particular implementation, the power available from the first and/or second power supply means, or energy holding means (if provided), is controlled with respect to the power consumption required for transmission of a frame fragment. The length of each time period between two consecutive frame fragments (and before the first fragment) may particularly be controlled to be such, or to assume such a value, that the amount of energy/power stored in the first and/or second power supply means/energy holding means, e.g. being a charge reservoir, will not fall below a given value during transmission of the latter fragment. In an even more particular implementation the time periods are controlled to have such lengths that the amount of energy stored in the first and/or second energy holding means will never fall below a given value. The lengths of the respective time periods may also be controlled in such a manner that complete reloading of the first/second energy holding means is always allowed before transmission of a fragment or between transmission of consecutive frame fragments. Particularly the transmission of a subsequent frame segment is delayed if it is detected that the wireless media is available, i.e. that transmission would be allowed, before reloading or recharging can be completed, such that, even if the wireless medium is available, transmission of the subsequent frame segment would be postponed.

In a particular implementation the data frames are IEEE 802.11 MAC frames with a Duration/ID field indicating the duration of the utilization of the wireless medium by the ongoing data transaction and acknowledgement of the reception of the current fragment. This means that the implementation of Duration/ID is differently defined than in the IEEE 802.11 standard, which says that the Duration/ID should indicate the duration time that the wireless medium will be utilized by the ongoing data transaction. For each MPDU with a more fragment bit activated, the duration is equal to the time from the end of current MPDU until the next MPDU and subsequent acknowledgement thereof has been received. Thus, according to the present invention the fragments are sent separately instead of in one and the same burst, and the duration has been modified to include acknowledgment of the current frame only.

In such an embodiment the indication means particularly comprises a data field for the setting of a More Fragment (MF) bit. In particular the modulation technique for access that is used is OFDM. Of course any other modulation technique can be used, but the problems will be particularly apparent for OFDM or similar techniques, which are comparatively inefficient in the usage of power, or rather which demand a lot of power.

Particularly second power supply means are provided. Said second, also called auxiliary, energy providing means, or charge reservoir, may then comprise a capacitor bank provided on the network interface means, which particularly may be a so called NIC (Network Interface Card) an expansion card, a multimedia card or similar plugged in at the wireless station, or alternatively built in at the wireless station.

Particularly a fragment comprises means for indicating the duration during which the wireless medium will not be available for others. Said means may contain an indication relating to the reception of the acknowledgement (from the receiving side to which the frame is transmitted) relating to the frame itself only, thus allowing release of the wireless medium irrespectively of whether a further frame fragment will follow or not.

Particularly a frame is fragmented if the power consumption for transmission of the same frame in unfragmented form or within the same burst as the other fragments would be higher than the energy/power available in said first energy providing means, e.g. a battery or alternatively if it would be higher than the energy/power available in the first and second energy providing means, according to different implementations.

Particularly the wireless station comprises a Laptop, a Palmtop, a mobile station or any other wireless, particularly handheld, device or access point.

In a particular implementation a frame may be fragmented or divided into two, three or four fragments. It may also be divided into five or six, or even more, fragments. The wireless station is particularly used in an IEEE 802.11 WLAN requiring support for transmission of at least 1500 byte data frames. Particularly a fragment at least comprises 256 byte.

The technology also provides for a Wireless Local Area Network with a number of wireless stations and a number of access points or base stations, which supports transmission of data in frames of variable length. Particularly the Wireless Local Area Network may support fragmentation of long frames (for another purpose as discussed earlier). For transmission of a frame from a wireless station or an access point, which frame, e.g. exceeds a given length or requires an output power exceeding a given value, frame fragmentation is implemented by dividing the frame into a number of fragments. Each fragment is sent as a non-fragmented frame, e.g. fulfilling transmit requirements given by the medium access control mechanism DCF (Distributed Coordination Function). Particularly means are provided in the wireless station or an access point for controlling the lengths of the time periods before each frame fragment or between consecutive frame fragments in order to allow for reloading energy providing/power supply means in or associated with the wireless station, such that the available power supply can be controlled with respect to the output power requested for transmission of the frame fragment. Particularly indication means are provided to indicate if a further frame fragment is to follow. Particularly the wireless stations of the wireless LAN comprise first energy holding means or power supply means, e.g. a battery. They may in addition thereto comprise second, auxiliary, energy holding means or power supply means to be used for additional power supply, whereby said auxiliary means are reloadable or rechargeable, and e.g. are provided in network interface means, such as a NIC or similar.

Particularly, for a wireless station, the time periods before/between transmission of frame fragments are controlled to have or assume such lengths that the power/energy available for transmission, by means of said first and/possibly also second power supply means or energy holding means, will never fall below a given value. Particularly the transmission of a subsequent frame fragment is delayed even if it can be detected that the wireless media is available, if recharging has not been completed, in order to actually allow for a complete reloading or recharging or reloading to the desired degree.

Particularly the data frames are so called MAC frames (IEEE 802.11) with a Duration/ID field to indicate the duration of the utilization of the wireless medium. However, the duration is indicated as the duration until reception of the acknowledgment of the current frame (and not of the subsequent frame and its acknowledgment, as is the case according to IEEE 802.11), irrespectively of whether a further frame fragment will follow or not.

Particularly the indication means comprises a data field for setting of a more fragment bit, and an access system implementing OFDM as modulation technique. Particularly the duration field, if this implementation is supported as referred to above, only includes the reception of the acknowledgment of the current frame fragment itself and thus allows for release of the wireless medium after that.

In one implementation a frame is fragmented if the length exceeds a given value, or if the power consumption for transmission of the same frame in unfragmented form or as fragments within the same burst would be higher than the energy/power available in said first energy holding means, e.g. the battery, and/or the second energy providing or holding means or would exceed a given value. This means that an estimation is done as to the power that would be consumed. Alternatively, as discussed above with reference to the wireless station, a limit could be a given, below which the energy content in the first/second energy holding means, should not fall. Alternatively the lengths of the periods between consecutive frame fragments or before each fragment are such as to allow for a complete reloading of the second energy holding means if any, during the period, or alternatively from the first energy holding means. E.g. for a palm-held device with integrated WLAN-functionality, power could be drawn directly from the sole, first energy holding means.

Still further the division into fragments may be done in relation to available power, this may also determine the number of fragments. This may also be done by iteration by determining if a frame can be sent unfragmented, or if the energy content is enough if it is fragmented into two fragments, three fragments etc. The periods may also be determined individually when a fragment is to be transmitted.

Particularly the wireless LAN is an IEEE 802.11 WLAN requiring support for transmission of at least 1500 byte data frames.

The technology also provides a method for transmitting data frames of variable lengths over a wireless medium in a wireless LAN. Before transmitting a frame from a wireless station, the method includes the steps of; dividing the frame into frame fragments (if it is determined that it is a so called long frame; this can however be done in any appropriate manner on any appropriate condition); sending each frame fragment as an unfragmented frame; determining the length of a respective time period to lapse before sending a fragment based on information about available power and power required for transmission of the frame fragment, such that at least partial reloading of first (or second auxiliary) power supply means or energy holding means in or associated with the wireless station will be allowed during such time period.

Particularly, in an advantageous implementation, the method includes the step of; indicating in each frame fragment if a further frame fragment will follow. Particularly the method may include the steps of; defining a given value for the energy/power content that should be available in or in association with the wireless station; determining the length of each of said time periods such that the energy/power content will not fall below said value at transmission of a frame fragment to be transmitted. Alternatively, or additionally, the method comprises the steps of; detecting when the wireless media is available for transmission of a fragment; delaying the transmission of a frame fragment if it is determined that the lapsed time period is not long enough to allow for recharging (partial or complete) of the energy holding means, (particularly of the second energy holding means if such are provided).

It is also possible to base the decision as to the number of frame fragments a frame should be divided into on the available amount of energy, or the size of the energy holding means. Otherwise a division is done in any manner, the lengths of the time periods being selected such that energy will be available.

Particularly the method may optionally include dividing a frame into any appropriate number of fragments between two and six.

Particularly the method includes the steps of dividing a frame into any appropriate number of fragments between two and six.

DETAILED DESCRIPTION OF THE INVENTION

IEEE 802.11 uses, as referred to earlier in the application, so called MAC (Medium Access Control) frames of variable size to transmit data over a Wireless Medium (WM). The maximum size of a frame (MSDU), header and FCS is 2346 octets. In the international standard ANSI/IEEE Std 802.11, First edition 1999 (ISO/IEC 8802-11, Wireless LAN Medium Access Control (MAC) and Physical layer (PHY) specifications, in section 7 the frame formats and particularly the MAC frame formats (section 7.1) are described, as also other frame formats in section 7.2. In the MAC sublayer functional description section 9, particularly sections 9.1, 9.2, access methods are described, as well as the control of the channel in section 9.2.5.5 and fragmentation in section 9.2.5.6. These documents, particularly the sections referred to, are herewith incorporated herein by reference thereto. Draft supplement to Standard for Telecommunications and Information Exchange between Systems—LAN/MAN Specific Requirements, part 11: Wireless Medium Access Control (MAC) and Physical layer (PHY) specifications: Medium Access Control (MAC) enhancements for Quality of Service (QoS), Draft supplement to IEEE Std. 802.11, 1999 Edition, IEEE Std. 802.11e/D1, March 2001, also is incorporated herein by reference thereto. According thereto, in order to increase the probability of successful transmission on channels where the reception reliability of long frames is low, unicast MSDUs can be divided into small fragments MPDUs.

Figure 1A:
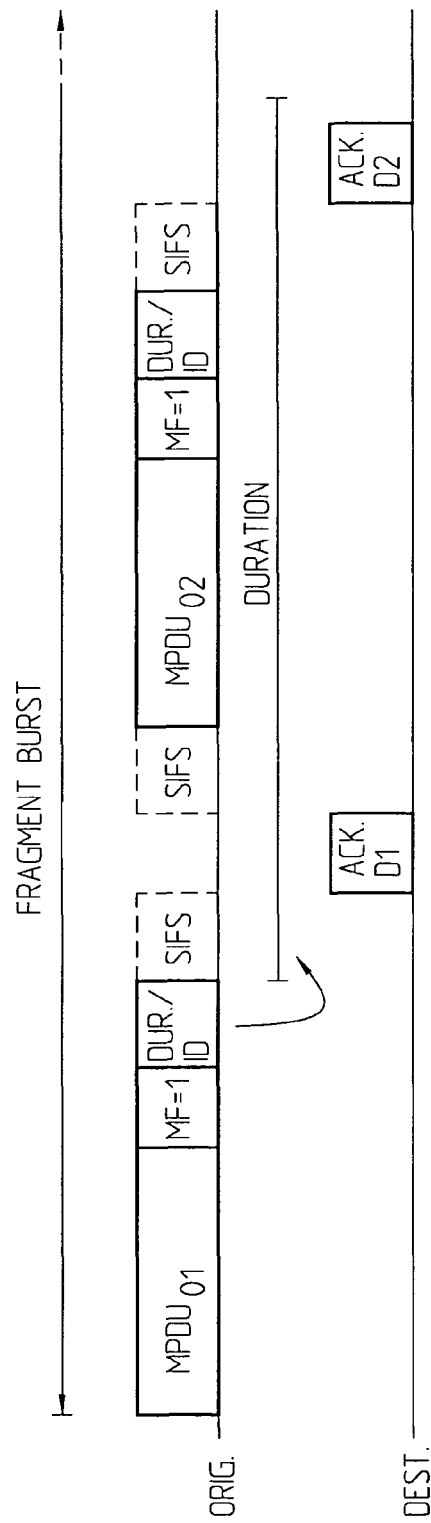
FIG. 1A schematically illustrates the duration as indicated in a duration field of a frame fragment with a more fragment bit set active for a state of the art system using fragmentation to increase the probability of a successful transmission.

In FIG. 1A, showing the above mentioned state of the art, a first fragment $MPDU_{01}$ is sent within the same fragment burst as a second fragment $MPDU_{02}$. During the Contention Period (CP) all fragments of an MSDU shall be sent in a single burst, as indicated. Each fragment in the burst is followed by a Short Inter Frame Space (SIFS), normally 16 µs, in turn followed by an acknowledgment frame sent by the destination side or by the receiver. ACK 01 here refers to the acknowledgement of the first fragment, whereas ACK 02 refers to the acknowledgment of the second fragment. On each acknowledgement follows a SIFS. Each fragment, here $MPDU_{01}$, except the last fragment of a burst, here $MPDU_{02}$, shall have a more fragment bit in the frame header set to one (MF=1) whereas the last fragment has MF=0. The more fragment bit MF is utilized by the receiving side, the destination, to determine whether or not all fragments in an MSDU have been received. The last fragment as well as non-fragmented MSDUs shall have the more fragment bit set to zero, cf. FIG. 1B where it is supposed that $MPDU_{01}$, is the last fragment in a burst. In FIG. 1A none of the two illustrated fragments are the last fragment, and consequently MF=1 for both.

Figure 1B:
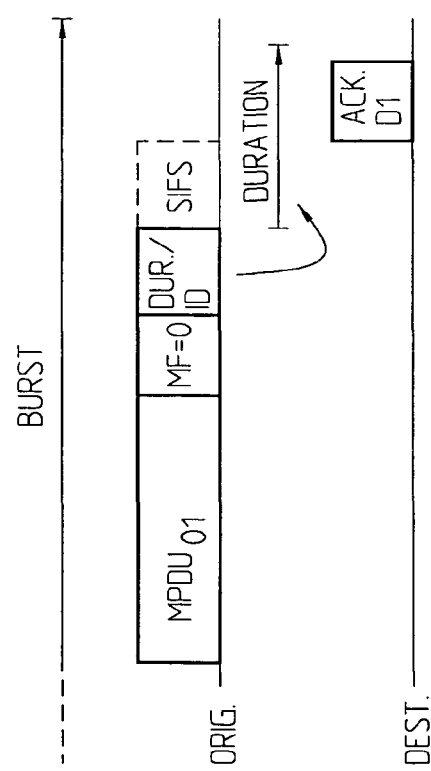
FIG. 1B illustrates the corresponding duration for a frame fragment wherein the more fragment bit is set inactive, FIG. 2 schematically illustrates a first embodiment of a wireless station comprising a LapTop with a NIC, FIG. 3 schematically illustrates another example of a LapTop with a NIC, FIG. 4 schematically illustrates an implementation where a delay is introduced between the sending of a first fragment and a second fragment, FIG. 5 schematically illustrates the duration, if the more fragment bit activated, FIG. 6 schematically illustrates transmission of a frame as three fragments with an approximate illustration of the variation in energy content in the second energy holder during transmission.

In FIG. 1B it is supposed that $MPDU_{01}$, is the last fragment in a burst, preceding fragments within the same burst not being illustrated for reasons of clarity.

The header of each MPDU contains a Duration/ID that indicates the duration in time that the Wireless Medium (WM) will be utilized for the ongoing data transaction. For each MDPU with the MF bit activated, the duration is equal to the time from the end of the current MPDU until the next MPDU is transmitted and the corresponding ACK is received.

The Duration/ID field is utilized to prevent other WLAN Network interface Cards (NIC) to start transmitting on the WM.

IEEE 802.11a specifies eight different OFDM modulation modes, with the slowest mode having a rate of 6 Mbps and the fastest having a rate of 54 Mbps. The modes corresponding to 6, 12 and 24 Mbps are mandatory. As referred to earlier the long transmit time needed for the transmission of an MSDU, even if divided into MPDUs as in FIG. 1A, 1B, constitutes a problem, particularly for small devices with limited battery power, since the power consumption during the transmit time exceeds the energy that can be charged from the interface towards a mobile host. Even if a charge reservoir, such as for example a capacitor bank is built at the NIC transmitter, since the large current needed during transmission can not be taken from the mobile terminal directly, this will not resolve the problems since there will not be enough energy. These problems are not addressed and will also not unintentionally be solved by fragmentation as in FIGS. 1a, 1b since the interframe spaces (SIFS) are too short (particularly 16 μs) to allow for any recharging between fragments in a burst.

Figure 2:
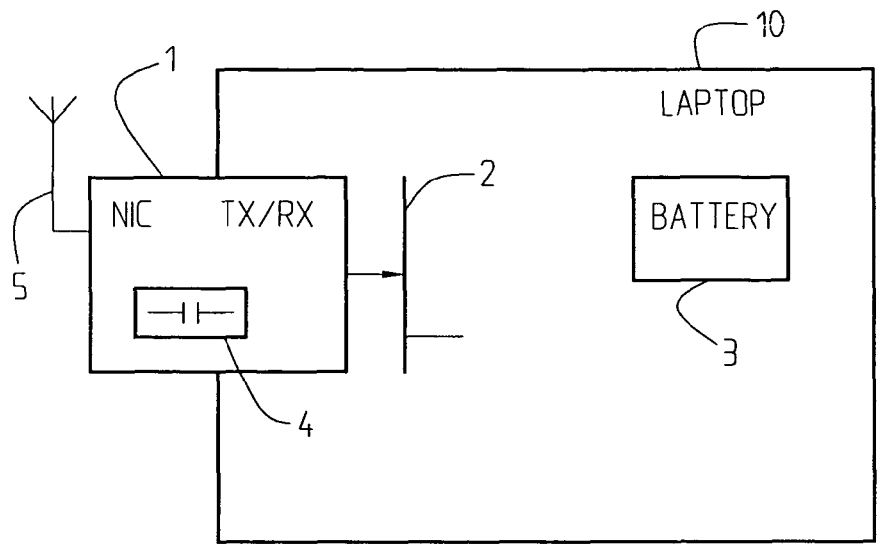

FIG. 2 is a very schematical illustration of a wireless station, e.g. a LapTop 10 with first energy holding means in the form of a battery 3, a network interface 2 to network interface means 1 in the form of a NIC (Network Interface Card) comprising a transmitting and receiving functionality TX/RX, antenna means 5 and reloadable second energy holding means 4, also denoted second power supply means.

Figure 3:
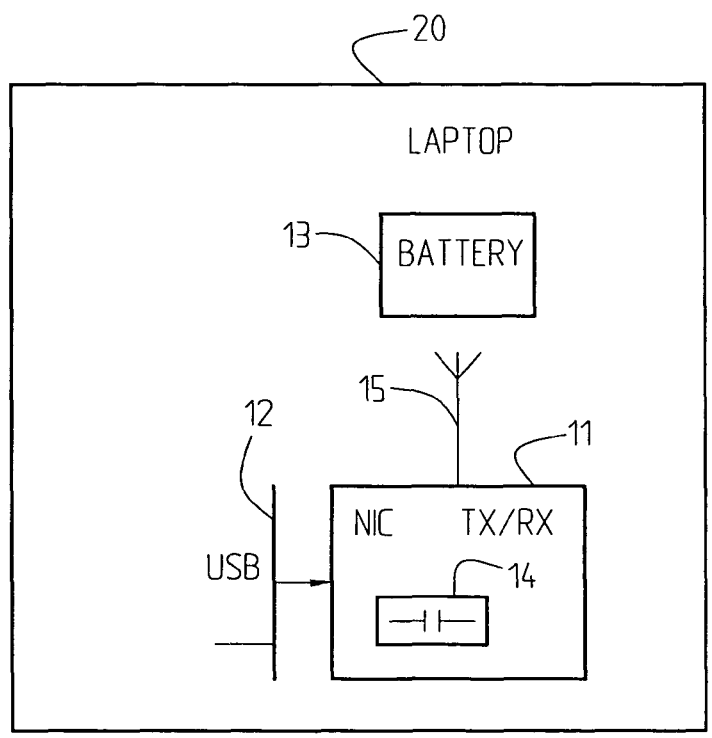

FIG. 3 schematically illustrates an alternative implementation of a wireless station, also here a LapTop 20, with first energy holding means, battery 13, a network interface CardBus or USB 12 towards an integrated WLAN NIC 11 with a transmitting and a receiving functionality TX/RX. The built in NIC comprises an integrated antenna 15 and it is provided with reloadable second energy holding means 14. Generally the difference between the wireless stations in FIGS. 2 and 3 is that, in FIG. 2 the network interface means are plugged in, whereas in FIG. 3 they are built in or integrated with the wireless stations.

The fragments of a fragmented frame are sent separately using the rules for fragmented frames, with the difference that the more fragment bit of each fragment, except for the last fragment, should be set to 1. The time period between consecutive transmissions of fragments is increased allowing the second, reloadable, energy holding means 4;14 of NIC 1;11 to be reloaded. Particularly such second energy holding means comprises a charge reservoir or a capacitor bank. The sender or transmitter can also utilize the ability to delay the transfer or transmission of a fragment until the energy stored in the second energy holding means allows for a fragment to be transmitted without causing the energy content of the second energy holding means to decrease below a certain critical limit during the transmission of the fragment. This may for example be the case if a sender detects that the Wireless Medium is eligible for transmission after the transmission of the previous fragment so soon that there has not been enough time to reload or refill the second energy holding means. To delay an MPDU transfer is a legitimate action also according to present standards. After a fragment has been sent, the receiver will detect that another fragment belonging to the same MSDU will follow, since the more fragment bit was set or activated, here=1.

Figure 4:
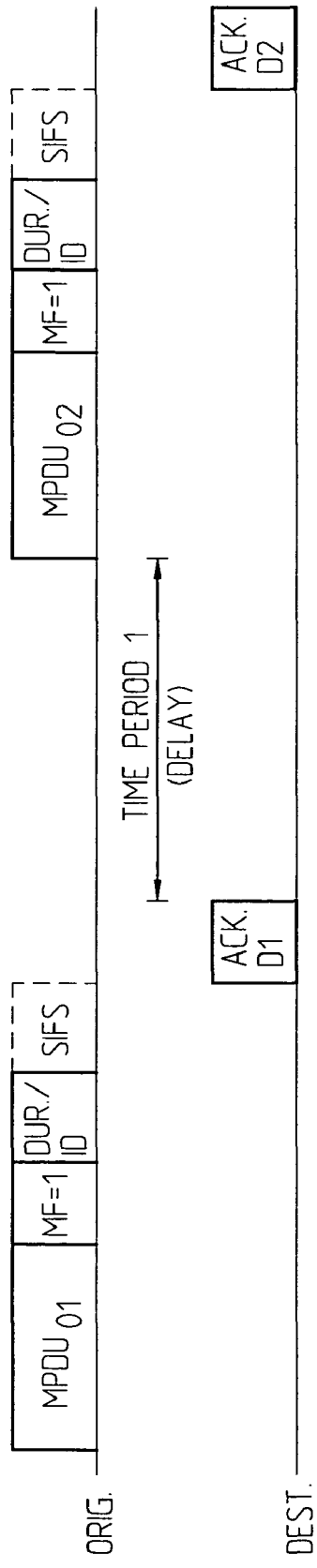

This is illustrated in FIG. 4 in which it is supposed that an MSDU has been divided into a number of fragments, illustrated in the figure are only $MPDU_1$, $MPDU_2$. Since $MPDU_1$ is not the last fragment MF=1, and when the acknowledgment ACK1 has been received from the destination, it is awaited a time period until the subsequent fragment $MPDU_2$ is transmitted, which in this case is not supposed to be the last fragment i.e. MF is set=1. However, no further frame fragments are illustrated in this figure for reasons of clarity. Like in the state of the art case, when there is no more fragment to follow, MF should be set=0. During time period 1, i.e. the time period between $MPDU_1$ and $MPDU_2$, or the delay as referred to above, the second energy holding means can be reloaded. According to one implementation it is possible to, between each transmission of a fragment, completely reload the second energy holding means. Alternatively it may be reloaded to at least a certain level. Still further it may be reloaded to a level such as to ensure that the subsequent frame fragment can be sent without the energy level falling below a certain, predefined level, or simply assuming that it can be transmitted. Also other alternatives are possible.

In advantageous implementations it is thus assured, before sending of each fragment, i.e. also the first fragment, that there is enough energy in the second energy holding means to allow for the fragment to be sent, or alternatively to be sent without the energy level in the second holding means falling below a giving value. It is also used fixed time periods for reloading, e.g. depending on the number of fragments or on characteristics of the energy holding means.

It will be appreciated by those skilled in the art that normal medium access transmit rules have to be fulfilled, e.g. DCF, as well as the above described mechanisms.

In one particular implementation it is possible to use the content in the second energy holding means, or the extent degree to which it maximally can be loaded, to determine the number of fragments a frame should be divided into. It is also possible to use such information to divide the frame into a given number of frame fragments such that the first fragment can be sent without preceding reloading. This is not illustrated in FIG. 4, and it would correspond to a time period 0 (for example) before the transmission of $MPDU_1$. Alternatively a reloading is performed also before the first fragment is transmitted. This would for example be relevant if the fragments are long or if the transmission of a preceding frame fragment just has been terminated. Thus, according to different implementations, the energy content can be used to determine the number of fragments into which a frame should be divided. It is also possible to use other criteria to determine the number of fragments a frame should be divided into.

In one implementation a time period is given after each transmission of a fragment during which reloading should take place, irrespectively if there is any frame or fragment waiting to be transmitted and irrespectively of whether the WM is free or not.

Figure 5:
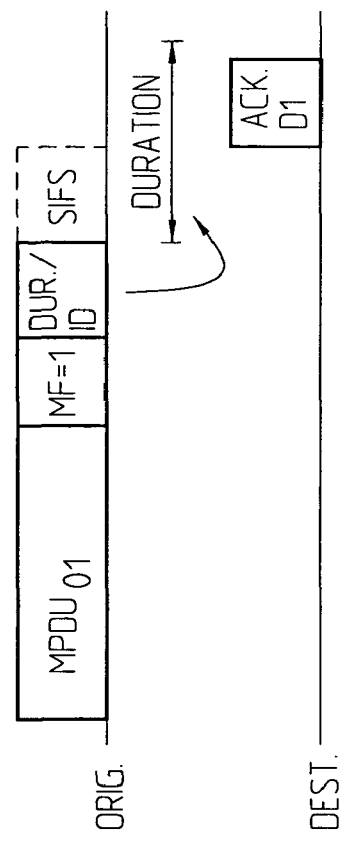

FIG. 5 very schematically illustrates a transmission of $MPDU_{o1}$ as in FIG. 4, which is supposed not to be the last fragment, i.e. MF=1 and the transmission of ACK1 from the destination side is also illustrated. The Duration/ID field indicates the duration as the time as from the sending of $MPDU_{o1}$ and including the reception of ACK1. This should be compared to FIG. 1A wherein the duration lasts until the reception of the subsequent acknowledgement, i.e. the acknowledgment of the subsequent fragment $MPDU_{o2}$.

Since, the duration is set so as to include the current acknowledgment only, the wireless media will not be occupied more than necessary.

The behavior at the receiving side will be the same as if the next fragment was sent but never arrived. Such a situation could for example also occur due to interference. Therefore the receiver will not be confused by the fact that only one fragment arrives even if there are more to follow. After transmitting a fragment, the sender or the origination side can wait as long as necessary to reach the desired degree of reloading or energy content before sending the next fragment.

Figure 6:
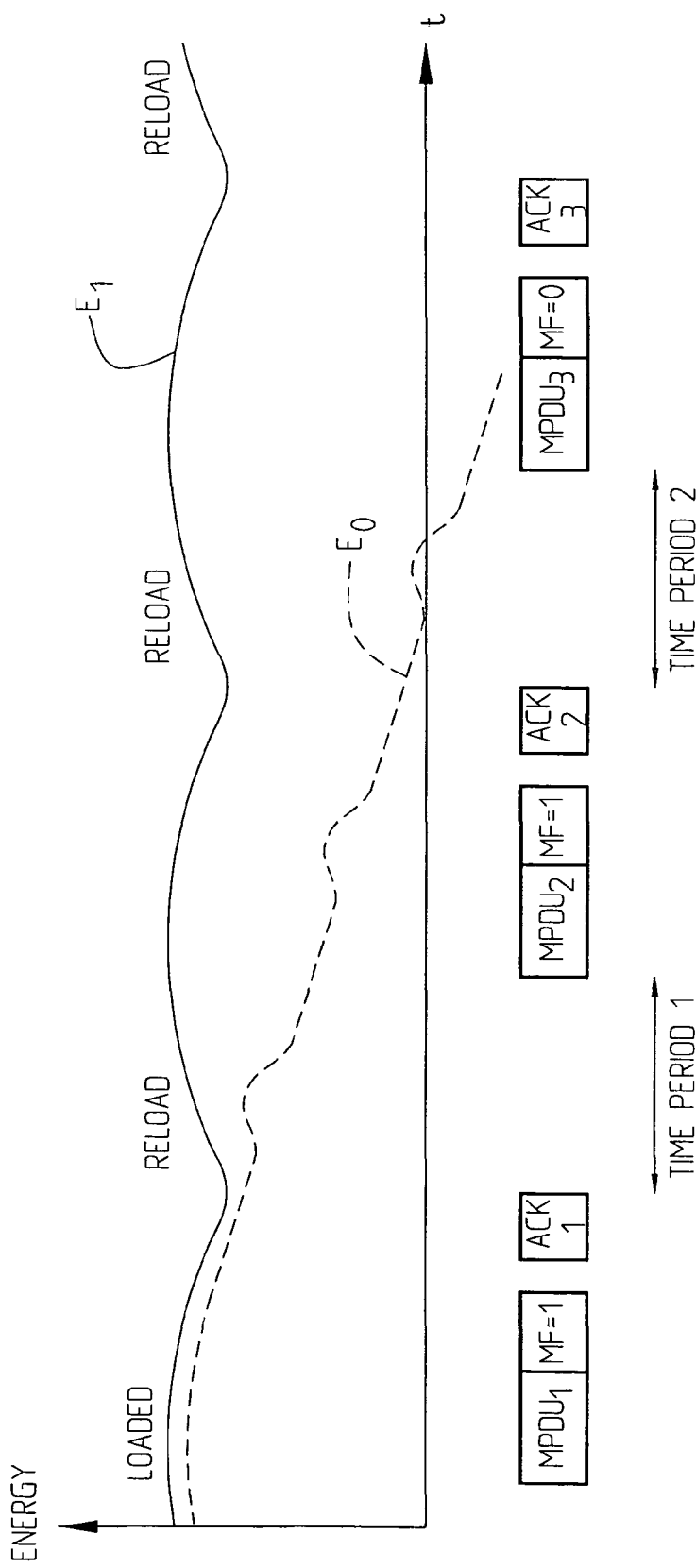

FIG. 6 very schematically illustrates transmission of a frame divided into three fragments, $MPDU_1$, $MPDU_2$, $MPDU_3$, between which time periods 1,2 are introduced in order to allow for appropriate reloading of the second energy holding means according to some given criteria. In the figure it is also schematically illustrated, in diagrammatic form, the energy content versus time, wherein $E_1$ corresponds to an example embodiment in which the second energy holding means is allowed to be completely reloaded between transmission of each fragment, and $E_0$ is taken to indicate how the energy would be consumed if the three fragments were to be sent in a burst. It is supposed that the second energy holding means have been completely reloaded at transmission of the first fragment.

It should be clear that this figure very schematically attempts to illustrate what the difference would be between a state of the art case and an implementation according to the example embodiment.

Figure 7:
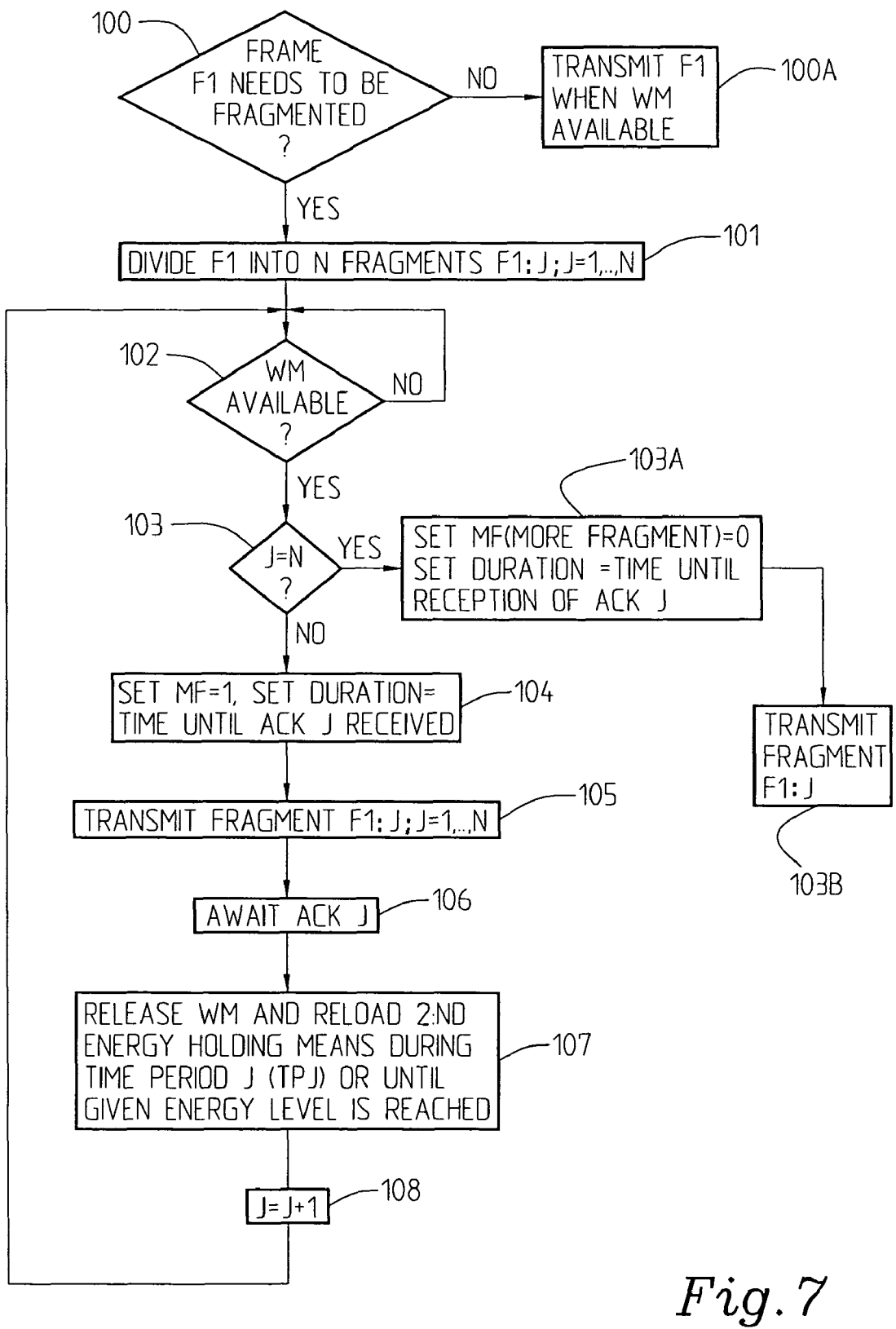
FIG. 7 is a first flow diagram illustrating implementation according to a first embodiment.

FIG. 7 is a flow diagram schematically illustrating one example implementation in procedural steps.

First it is established whether a frame F1 needs to be fragmented, 100. The determination as to whether the frame needs to be fragmented or not can be based on different criteria. It may for example be based on the length of the frame, the energy holding capability of the wireless station, a combination of both these factors, or it may be based on whether the frame (or a fragment) can be sent having regard to the energy holding capability, but it may also be based on any other criteria.

If, however, it is determined that a frame does not need to be fragmented, the frame will be transmitted when the wireless medium is available, in a conventional manner, 100A. If, on the other hand, it is established that F1 needs to be fragmented, F1 is divided into N fragments F1:J;J=1, . . . , N, 101. Also the determination has to know how many fragments a frame should be divided into, will be based on any of the above mentioned criteria. It may also be determined based on the assumption that at least one fragment should be possible to send, by the means of the available power in the first and/or second energy holding means. In an alternative implementation the number of fragments a frame should be divided into could be determined based on the length of the frame or on any other factor. Then it is established if the wireless medium is available, 102. If yes, it is determined if J=N, 103, i.e. if fragment number J (to be transmitted) is the last fragment. (These steps can be performed in any order, one example is given here.) If yes, the indication as to a following fragment, MF (More Fragment bit) should be set to 0 (or be inactivated). Preferably also the duration time is set as the time until the acknowledgement of reception of fragment J at the destination side is received, 103A. This particularly means the time starting when the fragment has been sent until the acknowledgment has been received. It is used to identify for how long time the wireless medium will be occupied. Then fragment F1:J is sent, 103B. If however J is not the last fragment, an indication is set that a further fragment will follow, i.e. MF=1. The duration is set as the time following transmission of fragment J until the corresponding acknowledgement of fragment J has been received, 104. Fragment F1:J is then transmitted, 105, the acknowledgment of fragment F1:J, ACK J is awaited, 106, and subsequently the wireless medium is released and the second energy holding means are reloaded during a time period (TPJ), until a given energy level has been reached, 107. According to different implementations the time period corresponds to the time that is required to completely reload the second energy holding means, or the time it takes until a given energy level has been reached. Alternatively the second energy holding means are reloaded much as possible until a given time period has lapsed. It is also possible to provide for reloading to such an extent that it can be assured that the subsequent frame can be sent without the energy content in the second energy holding means falling below a given value or that it would be completely unloaded. As TPJ has lapsed, it is proceeded with subsequent frame fragment F1:J+1, 108, restarting with step 102 etc.

In this implementation it is not illustrated that reloading may have to be done also before sending the first fragment which of course also may be relevant. In FIG. 7 it is supposed that the second energy holding means already has been reloaded up to a given level or completely. Otherwise it first has to be examined, e.g. after steps 100 and 101, or even before step 100 if a reloading is required. This may for example be the case if a preceding frame F0 (or fragment thereof) just has been transmitted. In that case a time period for reloading may be required before transmission of the first fragment of frame F1. This can be done at any stage up to step 105 in FIG. 7.

Figure 8:
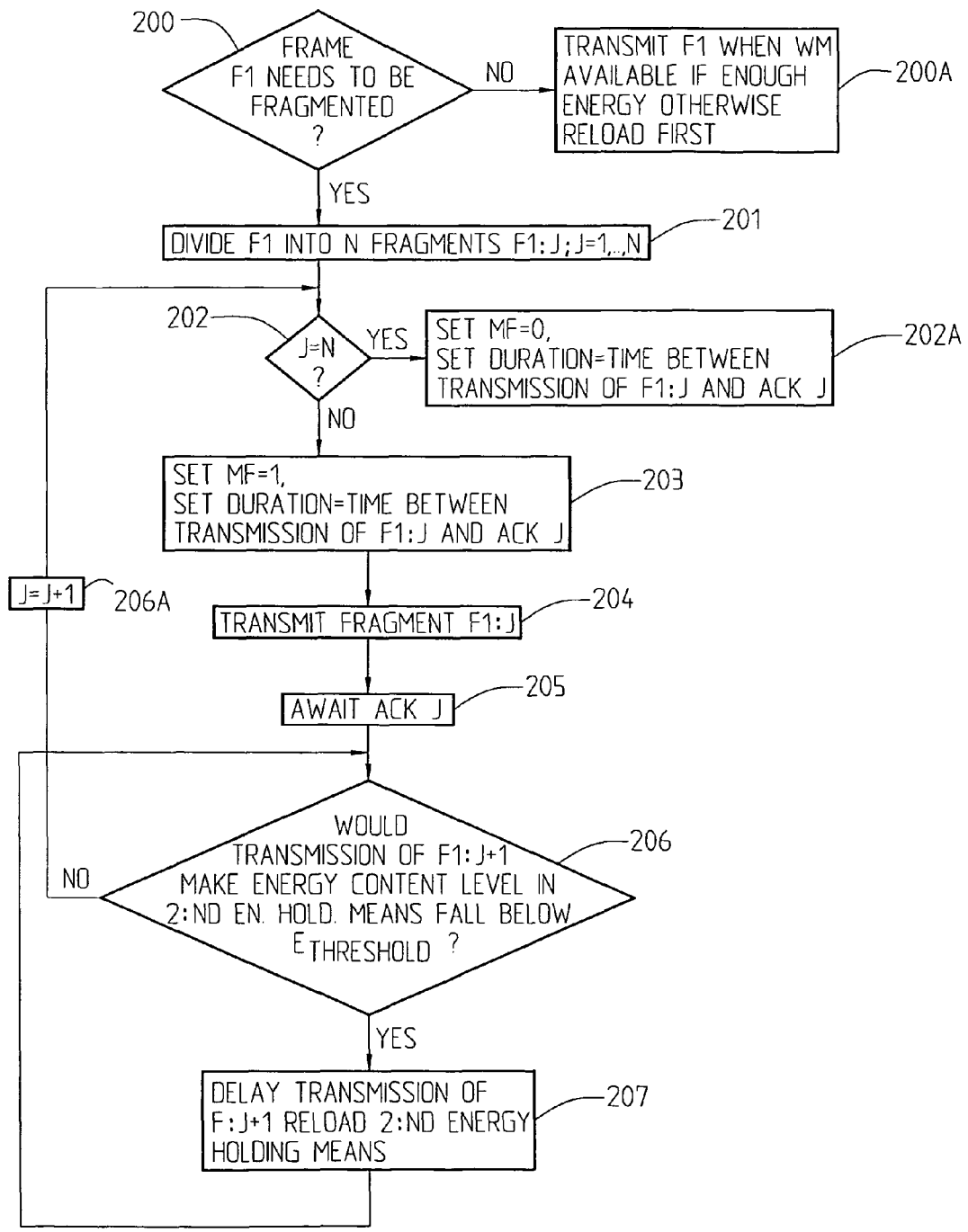
FIG. 8 is a flow diagram illustrating implementation according to a second embodiment.

FIG. 8 is a flow diagram substantially corresponding to the flow diagram of FIG. 7 but in which some of the steps are slightly modified.

As in the preceding embodiment, in a first step, 200, it is established if a frame F1 needs to be fragmented. This can be done in different manners as discussed above. If, however, based on the relevant criteria, it is determined that F1 does not need to be fragmented, F1 is transmitted when the wireless medium is available (if enough energy is available for transmission of F1). Otherwise a reloading of the second energy holding means may be performed first. Then it may be established if the whole frame can be sent, and if not, an examination will be done as to whether the frame needs to be fragmented (not illustrated in the figure), 200A. If it is determined that F1 needs to be fragmented, F1 is divided into N fragments F1:J;J, . . . , N, 201. Before the first fragment is sent, it will be established if there is enough energy in the energy holding means to send the first fragment, otherwise the transmission is delayed such that reloading of the energy holding means can take place, either to a given energy level or completely. Also the division into a number of fragments can be based on the available energy content or based on how the reload operation takes place. This is the reason that the first reloading step is not illustrated in the figure, since this step may be included in the division step or it may be done before the division step or alternatively it may be established whether the fragment can be sent without reloading after a division has taken place. However, supposing that at least the first fragment can be sent and that there has been a division into a number N of fragments, it examined if J=N, 202. If yes, the more fragment indication is set to 0 or inactivated and the duration is indicated to be the time period up to reception of the acknowledgment from the destination side of the reception of fragment J, 202A. If on the other hand J is not equal to N, i.e. a further frame fragment will follow, MF is set=1 and the duration is set as above, 203 F1:J is subsequently transmitted, 204, Then the acknowledgment of reception of fragment J is awaited, 205. Subsequently it is established if transmission of fragment F1:J+1 would make the energy content level in the second energy holding means fall below a threshold value $E_{threshold}$, 206. If yes, the transmission of F:J+1 is delayed while the second energy holding means are reloaded, 207, and it is examined if there is enough energy available after the reloading operation, 206 etc.

In one implementation this step can also performed after the step 203 for frame fragment F1:J (not illustrated).

However, if in step 206 it is established that the energy content level will not fall below the energy threshold, 206A, it will be proceeded with step 202 as far as frame fragment J+1 is concerned etc.

Thus, for the first fragment of the frame may either separate considerations be used in combination with determining the number of fragments the frame should be divided into, the time periods to be set for reloading etc., possibly also including the establishment of the power that would be consumed by the first fragment, or this may be done separately as part of the determination as to the number of fragments needed etc. Whereas at least for all subsequent fragments the same principles are used to determine whether reloading is needed or not, to which extent reloading is required etc., between transmission of each fragment the wireless medium is released and simultaneously it is allowed to reload the energy holding means.

It should be clear that the technology described above may be varied in a number of ways without departing from the scope of the appended claims. One advantageous way may be to implement a step corresponding to step 207 for each frame fragment, or more generally to implement the same step for each frame fragment to determine if reloading is required between two consecutive fragments and before the first fragment, i.e. irrespectively of whether the fragment is the first fragment or a subsequent fragment.

The number of fragments may for example depend on the length of the frame, such that a given number of fragments are always used if the length of the frame exceeds a given value, whereas another number of fragments are used if the frame length exceeds another value etc., i.e. the number of fragments is fixed for a particular frame length.

Further, although the specifically described embodiments generally include second power supply/energy holding means, their inclusion might not always be necessary e.g. in case of a device with an integrated WLAN functionality with but one sole energy holding/power supply means. In that case the same considerations apply to the first energy holding means as those discussed with reference to the second energy holding means.

With technology described above, the transmit energy requirements can be kept low substantially without reducing the coverage area. This means that simple and less expensive WLAN devices can be built and used. This will increase the possibilities to use IEEE 802.11 5 GHz WLAN also for devices or stations operating with a limited power, such as for example handheld devices.

The invention claimed is:

1. A wireless station, for use in a wireless local area network (WLAN), comprising:
   a network interface for interfacing with a network interface device that includes a transceiver, an antenna, and a first power supply or energy holder, the wireless station supporting transmission of data in frames of variable length,
   means for dividing a frame into a number of frame fragments and for sending each fragment as a non-fragmented frame, each fragment containing an indication as to whether a further fragment will follow, a duration field for indicating a duration of utilization of a wireless medium to transmit a fragment that ends when an acknowledgement of receipt of the fragment is received regardless of whether a further frame fragment will follow such that use of the wireless medium may be released between consecutive frame fragments irrespectively of whether a further frame fragment will follow,
   means for controlling a length of a time period before transmission of a frame fragment or between transmission of consecutive frame fragments in order to decrease energy consumption by the wireless station during a predetermined time interval, wherein the means for controlling is configured to control the length of the time period to allow reloading of the first power supply or energy holder such that the amount of power or energy stored in the first power supply or energy holder does not fall below a given value during transmission of the frame fragment or the second frame fragment of two consecutive frame fragments; and
   a second power supply or energy holder different from the first power supply or energy holder,
   wherein the first power supply or energy holder is one of a battery and a capacitor and the second power supply or energy holder is the other of the battery and the capacitor.

2. A wireless station according to claim 1, wherein the power needed for a subsequent transmission of a frame fragment at a specified power level requires power to be supplied from both the first power supply or energy holder and the second power supply or energy holder.

3. A wireless station according to claim 1, wherein the means for controlling is configured to control the length of each time period before transmission during a predetermined time interval such that during the predetermined time interval the second power supply or energy holder recharges sufficiently to ensure that the first power supply or energy holder together with the second power supply or energy holder can provide sufficient power needed for a subsequent transmission of a frame fragment at a specified power level.

4. A wireless station according to claim 1, wherein the length of the time period is such that the amount of energy stored in the first and/or second energy holder does not fall below a given value.

5. A wireless station according to claim 1, wherein the length of the time period is such that the second energy holder is reloaded before transmission of a next frame fragment.

6. A wireless station according to claim 1, wherein the means for controlling is configured to delay the transmission of a subsequent frame fragment even if the wireless media is available for transmission to permit reloading/recharging of the first power supply or energy holder to a desired level.

7. A wireless station at least according to claim 1, wherein the second power supply or energy holder comprises a charge reservoir provided on the network interfacing device.

8. A wireless station according to claim 1, wherein the network interfacing device comprises a Network Interface Card (NIC), an expansion card, a multimedia card, or a similar card plugged-in or built-in/integrated with the wireless station.

9. A wireless station according to claim 1, wherein the means for controlling is configured to fragment a frame if an estimated power consumption for transmission of the frame in unfragmented form or within the same burst would be higher than power or energy available in the first and/or second power supply or energy holder.

10. A wireless station according to claim 1, wherein the WLAN is an IEEE 802.11 WLAN that supports transmission of at least 1500 byte data frames.

11. A wireless station according to claim 10, wherein a fragment at least comprises 256 bytes.

12. A Wireless Local Area Network (WLAN) comprising a number of wireless stations and/or a number of access points or base stations that support transmission of data in frames of variable length and fragmentation of long frames, each wireless station including and a first energy holder or power supply,
  wherein for transmission from a wireless station or an access point of a frame that exceeds a given length or requires an output power or energy exceeding a given value, means are provided for dividing the frame into a number of fragments, each fragment being sent as a non-fragmented frame that contains an indication as to whether a further fragment will follow and a duration field which indicates a duration of utilization of a wireless medium to transmit a fragment that ends when an acknowledgement of receipt of the fragment is received, regardless of whether a further frame fragment will follow, thereby releasing the wireless medium between consecutive frame fragments regardless of whether a further frame fragment will follow,
  means provided in the wireless stations or access points for controlling a length of a time period between consecutive frame fragments or before transmission of a frame fragment in order to decrease energy consumption during a predetermined time interval, wherein the controlling means is configured to control the length of the time period to allow reloading of the first power supply or energy holder such that the amount of power or energy stored in the first power supply or energy holder does not fall below a given value during transmission of the frame fragment or the second frame fragment of two consecutive frame fragment,
  wherein wireless stations further comprise a second, auxiliary energy holder or power supply, and
  wherein the first power supply or energy holder is one of a battery and a capacitor and the second power supply or energy holder is the other of the battery and the capacitor.

13. A wireless LAN according to claim 12, wherein the power needed for a subsequent transmission of a frame fragment at a specified power level requires power to be supplied from both the first power supply or energy holder and the second power supply or energy holder.

14. A wireless LAN according to claim 12, wherein the controlling means is configured to delay transmission of a subsequent frame fragment even if the wireless media is available to permit recharging or reloading of the first and/or second power supply or energy holder.

15. A wireless LAN according to claim 12, wherein the wireless LAN is an IEEE 802.11 wireless LAN that supports transmission of 1500 byte data frames.

16. A method for transmitting data frames of variable length over a wireless medium in a wireless LAN, comprising:
  determining that a frame to be transmitted needs to be divided into fragments,
  dividing the frame into N frame fragments,
  indicating in each frame fragment whether a further frame fragment will follow,
  indicating a duration as a time of utilization of the wireless medium by a currently-transmitted frame fragment until acknowledgement of receipt of that frame is received regardless of whether a further fragment of the frame will follow,
  sending each frame fragment as an unfragmented frame after lapse of a time period the length of which is selected in order to decrease energy consumption during a predetermined time interval, the length of the time period being selected so as to allow for reloading of a first power supply or energy holder located in or associated with the wireless station to a desired extent during that time period such that the amount of power or energy stored in the first power supply or energy holder does not fall below a given value during transmission of a frame fragment,
  wherein a second power supply or energy holder different from the first power supply or energy holder is located in or associated with the wireless station, and
  wherein the first power supply or energy holder is one of a battery and a capacitor and the second power supply or energy holder is the other of the battery and the capacitor.

17. A method according to claim 16,
  wherein the power needed for a subsequent transmission of a frame fragment at a specified power level requires power to be supplied from both the first power supply or energy holder and the second power supply or energy holder.

18. A method according to claim 16, further comprising:
  detecting when the wireless media is available for transmission of a frame fragment,
  delaying the transmission of the frame fragment if an elapsed time period is not long enough to allow for a desired reloading of the power supply or energy holder.

19. A method according to claim 16, further comprising:
  using OFDM as a modulation technique,
  wherein the wireless station supports transmission of 1500 byte frames.

20. A method according to claim 17, wherein during a predetermined time interval the second power supply or energy holder recharges sufficiently to ensure that the first power supply or energy holder together with the second rechargeable power supply or energy holder can provide sufficient power needed for a subsequent transmission of a frame fragment at a specified power level.

21. A wireless LAN according to claim 12, wherein the means for controlling is configured to control the length of each time period before transmission during a predetermined time interval such that during the predetermined time interval the second rechargeable power supply or energy holder recharges sufficiently to ensure that the first power supply or energy holder together with the second power supply or energy holder can provide sufficient power needed for a subsequent transmission of a frame fragment at a specified power level.

* * * * *

UNITED STATES PATENT AND TRADEMARK OFFICE
CERTIFICATE OF CORRECTION

| | | |
|---|---|---|
| PATENT NO. | : 7,855,999 B2 | Page 1 of 1 |
| APPLICATION NO. | : 10/862023 | |
| DATED | : December 21, 2010 | |
| INVENTOR(S) | : Lindskog et al. | |

It is certified that error appears in the above-identified patent and that said Letters Patent is hereby corrected as shown below:

On the Title Page, in item (75), under "Inventors", in Column 1, Line 3, delete "Ravianda" and insert -- Rävlanda --, therefor.

In Column 3, Line 25, delete "ethernet" and insert -- Ethernet --, therefor.

In Column 7, Lines 46-48, delete "Particularly the method...............and six.".

In Column 8, Line 10, after "DESCRIPTION" delete "OF THE INVENTION".

In Column 9, Line 2, delete "interface" and insert -- Interface --, therefor.

In Column 12, Line 59, delete "204," and insert -- 204. --, therefor.

Signed and Sealed this
Fourteenth Day of February, 2012

David J. Kappos
*Director of the United States Patent and Trademark Office*